United States Patent [19]

Corser et al.

[11] Patent Number: 4,838,093
[45] Date of Patent: Jun. 13, 1989

[54] FLOW METER AND METHOD OF MEASURING FLOW

[75] Inventors: George Corser, Flint; Gary C. Hammond, Bancroft; Dale P. Eddy, Flint, all of Mich.

[73] Assignee: GMI Engineering & Management Institute, Flint, Mich.

[21] Appl. No.: 131,921

[22] Filed: Dec. 11, 1987

[51] Int. Cl.⁴ ............................................. G01F 1/22
[52] U.S. Cl. ............................ 73/861.53; 73/861.54
[58] Field of Search ............... 73/239, 861.47, 861.48, 73/861.53, 861.54, 861

[56] References Cited

U.S. PATENT DOCUMENTS

| | | | |
|---|---|---|---|
| 2,868,225 | 1/1959 | Wigham et al. | 73/861.53 X |
| 3,083,576 | 4/1963 | Kanes . | |
| 3,359,795 | 12/1967 | Walsh | 73/861.53 X |
| 3,377,857 | 4/1968 | Moscarini | 73/861.53 |
| 3,403,556 | 10/1968 | Koester | 73/861.53 |
| 4,007,628 | 2/1977 | Worcester | 73/269 X |
| 4,212,200 | 7/1980 | Rousseau | 73/861.47 |
| 4,279,161 | 7/1981 | Huston et al. . | |
| 4,484,479 | 11/1984 | Eckhardt | 73/861.47 |
| 4,604,901 | 8/1986 | Kagi . | |
| 4,667,517 | 5/1987 | Holden . | |
| 4,690,000 | 9/1987 | Schmaus . | |

OTHER PUBLICATIONS

Mechanical Measurements, Beckwith, T. G, & Buck, N. Lewis, 1969, pp. 383-384.
OIS Linear Array Photosensor, PS39, Sep., 1987, Ovonic Imaging Systems, Inc.
Photodiodes, pp. 10-11 (undated), Hamamatsu Photonics Sensors.
Sensors Magazine, Sep., 1987, Schlumberger advertisement.

Primary Examiner—Herbert Goldstein
Attorney, Agent, or Firm—Brooks & Kushman

[57] ABSTRACT

The invention includes a wall member which defines an expandable volume having a fluid inlet and a fluid outlet. The expandable volume varies in size as a function of fluid flow rate, and the deformation of the wall member resulting therefrom provides an indication of flow.

24 Claims, 3 Drawing Sheets

FLOW METER AND METHOD OF MEASURING FLOW

FIELD OF INVENTION

This invention relates to flow meters and methods for measuring flow, more particularly to methods and meters which utilize an expandable volume which deforms to vary in size as a function of fluid flow rate.

BACKGROUND OF INVENTION

Numerous methods and apparatuses have been developed for the purpose of measuring flow of a fluid. The accurate measurement of the flow of a fluid presents many varied design problems depending upon the type of fluid in the particular application. In some instances, flow can be measured directly by checking the weight or volume of the fluid flow for a given interval of time, or by utilizing a positive displacement meter. Flow may also be measured indirectly using obstruction meters, velocity probes, or a variety of highly specialized meters such as anemometers, coriolis effect flow meters, sonic flow meters and magnetic flow meters. Choosing a flow meter is always a compromise, and a number of factors have to be carefully considered, namely, cost, size, range, types of fluid, form of output, and accuracy.

There are many applications, such as commercial and residential gas meters, where it is important to accurately measure total flow over a specific time interval during which flow may vary widely from the extremely small flow rate required by a pilot light to a maximum flow rate which may occur when all of the gas powered appliances are operating simultaneously. When using positive displacement pumps as is currently the norm in gas measurement, high accuracy can be achieved at both the high and extremely low flow rates. With the current trend toward supplying remotely readable gas meters, it is necessary to add electrical output devices to positive displacement flow meters, thereby greatly increasing their cost. The principal draw-back preventing use of indirect flow measurement devices has been the lack of accuracy throughout the wide operating range of flows. Most indirect flow meters capable of accurately measuring pilot light flow are too restrictive at high flow rates, and conversely flow meters capable of accurately measuring high flow rates cannot accurately sense extremely low flows.

FEATURES, OBJECTS AND ADVANTAGES OF INVENTION

An object of the present invention is to provide a flow meter and a method of measuring flow capable of accurately measuring flow over a very wide range.

Yet another object of the present invention is to provide a flow meter which physically occupies little space.

It is yet another object of the present invention to provide a flow meter capable of providing a remote output signal.

An advantage of the present invention is the low cost to produce the apparatus.

These and other features, objects and advantages of the present invention are apparent from the review of the accompanying description of the preferred embodiment.

SUMMARY OF INVENTION

A flow meter of the present invention includes a wall member which defines an expandable volume having a fluid inlet and a fluid outlet. The expandable volume varies in size as a function of fluid flow rate, and the deformation of the wall member resulting therefrom provides an indication of flow.

BRIEF DESCRIPTION OF THE DRAWINGS

FIG. 5 is a cut away plan view of an alternative embodiment of the invention;

DETAILED DESCRIPTION OF PREFERRED EMBODIMENT

Figure 1:
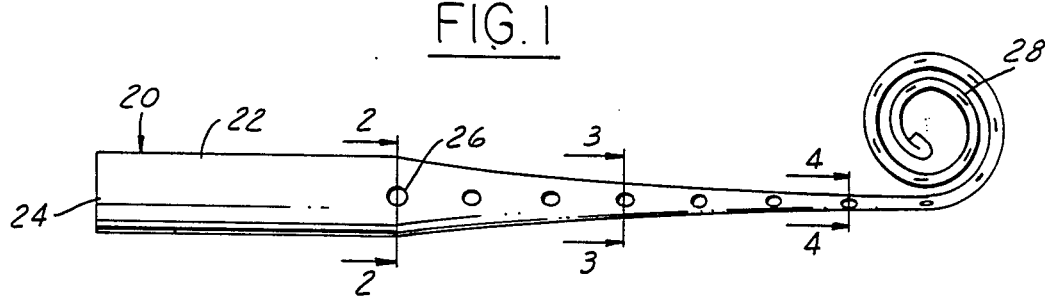
FIG. 1 is a side elevation of a preferred embodiment of the fluid, flow meter in the intermediate range flow state.

A simple preferred embodiment of the invention is illustrated in FIGS. 1-4. The flow meter 20 is formed of a wall member 22 which defines an expandable volume Wall member 22 is provided with a fluid inlet 24 and a plurality of outlet ports 26 spaced along the wall member. Outlet ports 26 serve as an outlet means for allowing fluid to exit the expandable volume defined by the wall member. Wall member 22 is formed in the shape of an elongated deflated tube. When the tube is deflated, it is generally flat and wound spirally to form a coil 28. Outlet ports 26 are sequentially spaced along the length of the deflated tube. As shown in FIG. 1, the tube is in the intermediate flow position, fluid entering wall member 22 through inlet 24 and exits through outlet ports 26. In the no-flow condition, coil 28 will wind up, i.e., move to the left in FIG. 1, thereby causing the volume of the region bound by the wall member 22 to decrease and the outlet ports 26 to be closed. As the coil endings and the tube extends as a function of flow, the ports are sequentially opened causing their effective area to vary as a function of flow rate.

Figure 2:
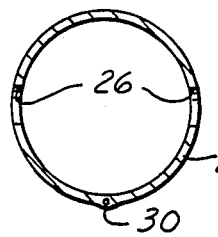
FIG. 2 is a cross-sectional view taken along line 2—2 of FIG. 1.
Figure 3:
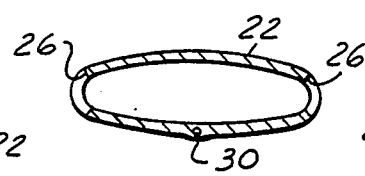
FIG. 3 is a cross-sectional view taken along line 3—3 of FIG. 1.
Figure 4:
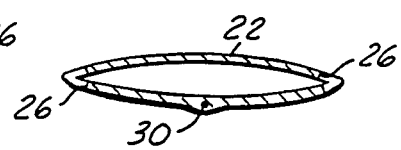

In order to cause the wall member to coil up, the wall member is preferably provided with a spring 30, which is shown in cross-sectional views 2-4. Spring 30 is preferably a thin spring steel wire which has sufficient tension to cause the spirally coiled section of tubing to be urged to the minimum wall member volume position. As flow rate increases, the spiral coil 28 will begin to unwind, sequentially opening outlet ports 26. It should be noted that outlet ports 26 gradually open and achieve a maximum effective area when the tube is fully inflated, as shown in FIG. 2. When the tube is only partially inflated, as shown in FIGS. 3-4, the effective open area of outlet ports 26 decreases substantially. It should be noted, however, that ports can alternatively be located on the outer portions of the tube wall, however, the location on the edge as shown is preferred. Furthermore, the size, number and location of the outlet ports 26 may be varied to suit the particular application Note, however, that a sufficiently large number of ports is desirable so that a relatively uniform wall deformation/flow relationship may be established without having a series of steps.

Figure 5:
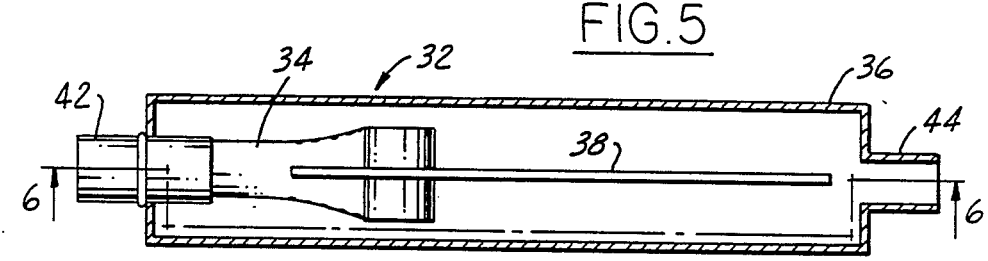
FIG. 5 is a cross-sectional view taken along line 4—4 of FIG. 1.
Figure 6:
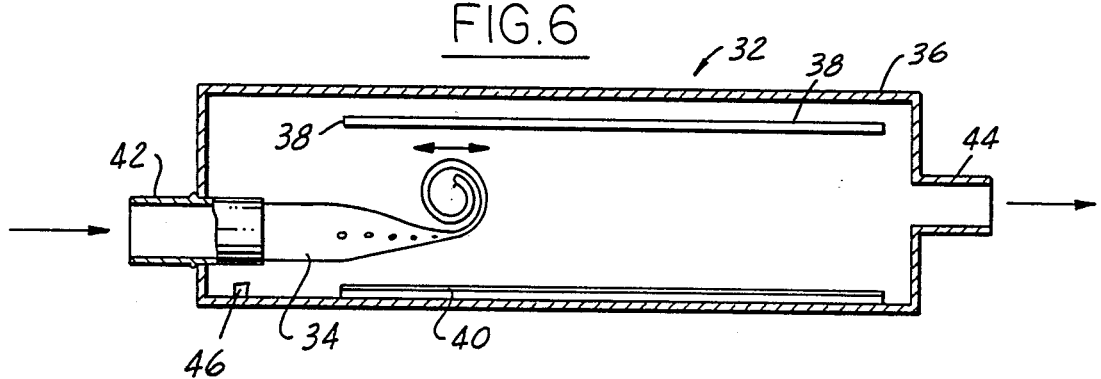
FIG. 6 is a sectional side view taken along line 6—6 of FIG. 5.
Figure 7:
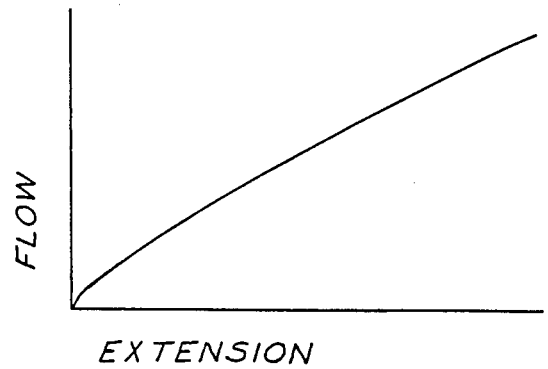
FIG. 7 is a plot showing the relationship between flow and extension of the expandable volume.

In the simple embodiment of the flow meter, as shown in FIGS. 1-4, flow is determined by observing the length of the wall member. In FIGS. 5-6 an alternative flow meter embodiment 32 is shown utilizing a similar spirally wound wall member 34 enclosed within a housing 36. Oriented on opposite sides of wall member 34 is a light source 38 and a light sensing array 40. As the spiral wall member expands and contracts in volume as flow varies, the amount of light which reaches light sensing array 40 will vary accordingly. The light sensing array light source combination thereby provides a simple frictionless means to sense the deformation of the wall member. The light sensing array serves as a position sensor and is provided with an output which can be utilized to calculate the flow of fluid passing through the meter. Housing 36 is further provided with an inlet 42 and an outlet 44. Inlet 42 is coupled to the wall member inlet, i.e., the end extending from the outer periphery of the spiral coil. As flow increases, the segment of the tube adjacent to the fluid inlet inflates and axially expands, unwinding the spiral coil an amount which varies as a function of flow rate. Preferably, the relationship between the extension of the wall member as it unwinds is linearly proportional to fluid flow, as shown in FIG. 7. It should be noted, however, that a non-linear relationship can be achieved, if so desired, by appropriately varying the size and spacing of the outlet ports.

It should also be noted that while circular output ports are shown, alternative outlet means for allowing a fluid to exit expandable volume, may be utilized, such as a series of slits extending through the wall, or even a porous wall material. The preferred wall material shown is non-porous and flexible, such as a synthetic rubber material such as latex or the like. A wide variety of wall materials may work including coated paper, however, the material should be very flexible to minimize hysteresis.

Figure 8:
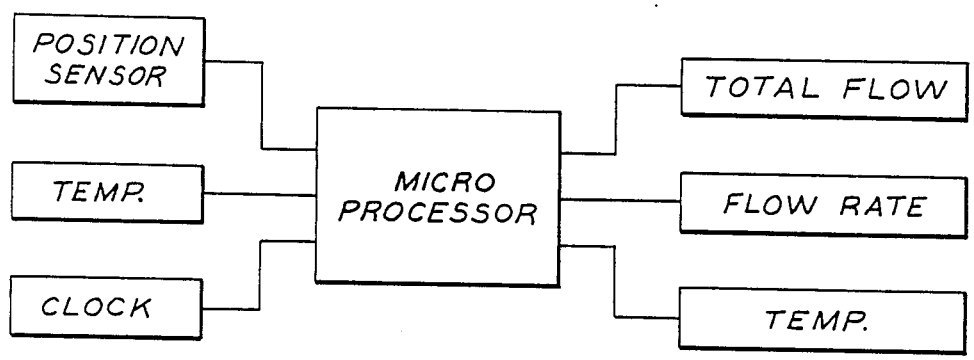
FIG. 8 is a block diagram of the flow output circuit.

A block diagram of an output circuit is shown in FIG. 8. The output of the light sensing array or other position sensing devices serves as an input for a microprocessor which will be used to calculate flow. Preferably, a temperature sensor such as thermistor 46, or the like shown in FIG. 6 can be incorporated as part of the flow meter and provide a indication of the fluid temperature. A clock can be further supplied to provide a time input to the microprocessor to calculate the volumetric flow rate and the total flow over some given time interval. If desired, the microprocessor can additionally provide a temperature output. The temperature sensor is particularly beneficial when the flow meter is used in conjunction with gaseous fluids where the density varies greatly as a function of temperature. The outputting circuit can be fabricated using a wide variety of readily available microprocessor, temperature sensor and clock components. A light source and a light sensing array of the configuration as shown in FIGS. 5-6 is commercially available from Ovonic Imaging Systems, Inc. of Troy, Mich.

Figure 9:
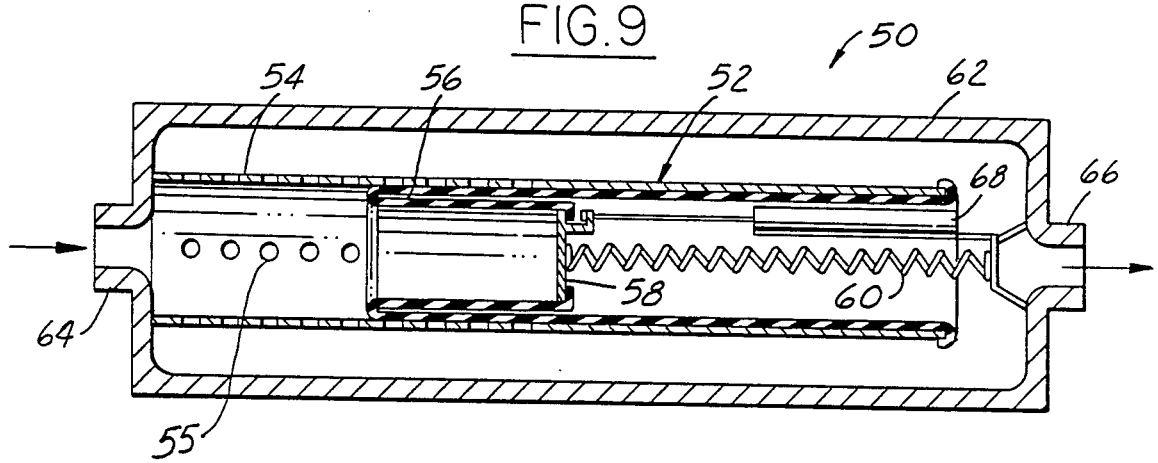
FIG. 9 is a cross-sectional side elevation of an alternative embodiment of the invention.

An alternative embodiment of the invention is shown in FIG. 9. Like the earlier embodiments, the flow meter 50 is provided with a wall member which defines an expandable volume. However, flow meter 50 has an expandable volume 52 formed of a rigid tube 54 and a flexible rolling sleeve 56. Tube 54 has a plurality of ports 55 axially spaced along its periphery. The combination of tube 54 and rolling sleeve 56 define an expandable volume which varies in displacement as sleeve 56 is turned inside out and rolled back on itself. One end of rolling sleeve 56 is affixed to the end of tube 54, and the other end of rolling sleeve 56 is affixed to end cap 58. Coil spring 60 urges end cap 58 to a position in which the expandable volume defined by wall member 52 is minimized. The wall member assembly is oriented within a housing 62 which is provided with a fluid inlet and fluid outlet, 64 and 66 respectively. Tube 54 is affixed to the housing adjacent the inlet. One end of spring 60 also is connected to the housing. In order to measure the position of the rolling sleeve 56 transducer 68 is provided to sense the location of end cap 58 relative to the housing. Transducer 68 can be any one of a number of conventional designs, such as a linear variable-inductance differential transformer (LVDT) or the like.

Figure 10:
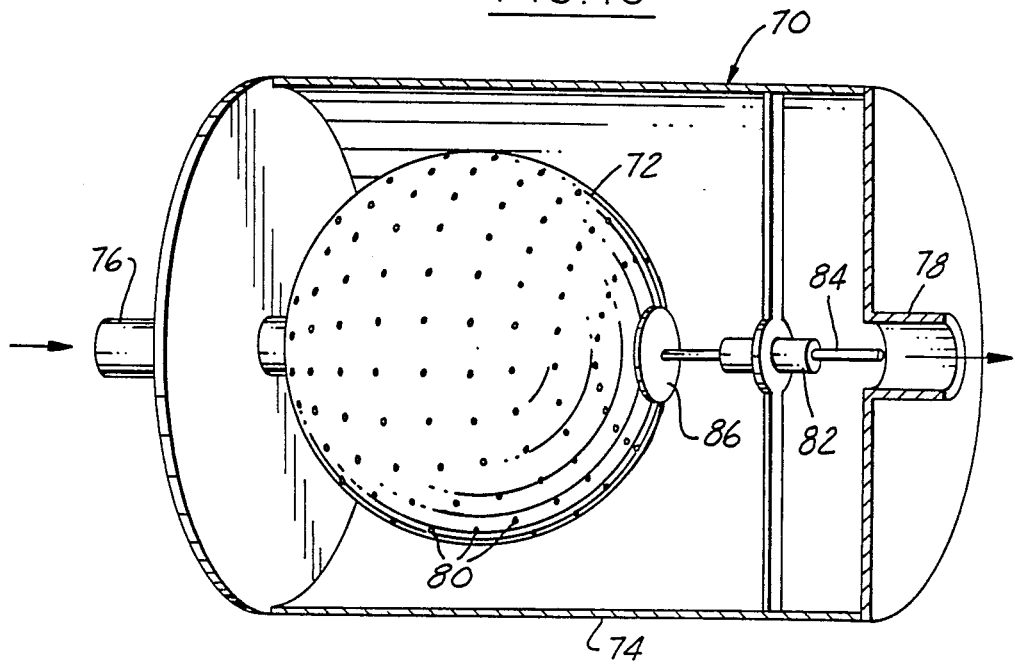
FIG. 10 is a cross-sectional side elevation of an alternative embodiment of the invention.

An alternative flow meter 70 is shown in FIG. 10 which utilizes a balloon-like wall member 72. Wall member 72 is enclosed within housing 74 which is provided with an inlet 76 and an outlet 78. The balloon-like wall member 72 is provided with a fluid inlet which is affixed to housing inlet 76 and has a plurality of output ports 80 spaced about the wall member surface. As fluid flow through the meter varies, wall member 72 varies in displacement causing the wall member and each of the outlet ports to elastically expand. The greater the fluid flow, the greater the effective area of the ports and the greater the size of wall member 72. The deformation of the wall member is sensed by transducer 82 which is provided with a central shaft 84 and a follower plate 86 which is attached to balloon-like wall member 72. It should be recognized that numerous other mechanisms can be utilized to measure the expansion of wall member 72, such as optical or proximity transducers.

Figure 11:
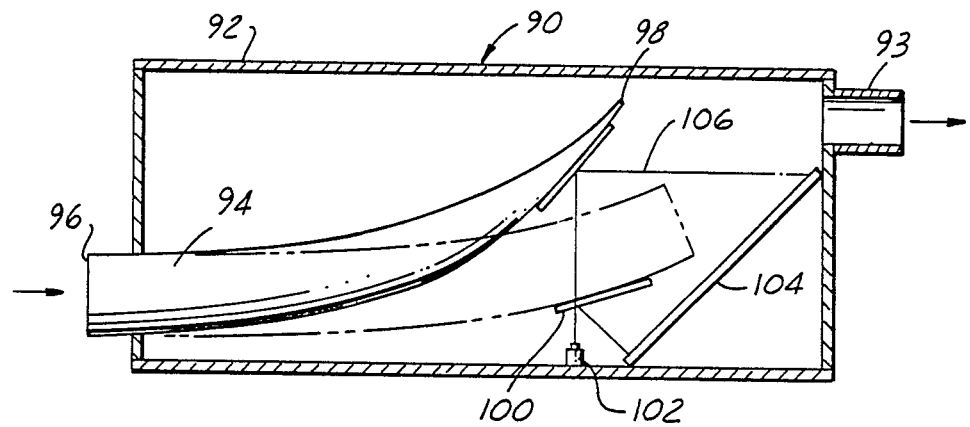
FIG. 11 is a cross-sectional side elevation of an alternative embodiment of the invention showing the wall member in the low flow state with the high flow state in phantom outline.

An alternative flow meter 90 is shown in FIG. 11. The flow meter is provided with a housing 92 having an outlet 93 and a wall member 94. Wall member 94 is formed of a semi-rigid thin wall tube which has one end which is open and forms and inlet 96, and the other end which is pinched flat and forms a variable area outlet 98. A mirror 100 is affixed to the periphery of the wall member adjacent the closed end 98. In the no-flow condition, wall member 94 is in a cantilevered position, depicted by the solid lines in FIG. 11. As flow increases, the outlet 98 of the wall member expands causing mirror 100 to move. In addition, the momentum load exerted on the wall member as a result of its arcuate shape further causes the wall member which is cantileveredly supported from the housing to deflect. In the maximum flow condition, wall member will obtain the position shown in dotted outline in FIG. 11. Light source 102 directs a beam of light at mirror 100 which is reflected onto light sensing array 104. The reflective light beam 106 strikes the light sensing array at a position which varies as a function of the flow of fluid through the meter.

Figure 12:
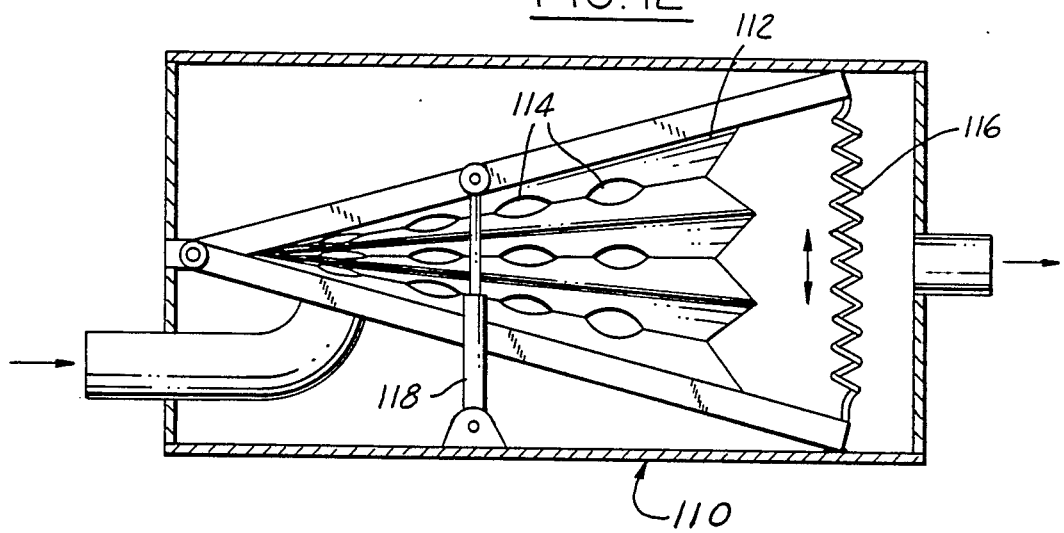
FIG. 12 is a side elevation of another alternative embodiment of the invention shown in the high flow state.

A final alternative embodiment of the invention is shown in FIG. 12 by flow meter 110. Flow meter 110 utilizes a wall member of a bellows design. Bellows 112 is provided with a plurality of output ports 114 which vary effective area as a function of the volume of the bellows. Spring 116 maintains the bellows normally in the minimum volume orientation. The bellows expands with increasing flow, and the expansion is sensed by a transducer 118. The flow meter otherwise operates in a similar manner to the other embodiments previously described.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

I claim:

1. A fluid flow meter comprising:
   a wall member defining an elastically expandable volume, said wall member having a fluid inlet, a fluid outlet formed by a plurality of ports extending through said wall member for allowing fluid to exit the expandable volume, said ports being substantially closed in the no-flow condition, and having an increasing effective open area with increasing wall member volume, and means for resisting the deformation of the expandable volume;
   wherein said expandable volume varies in size as a function of fluid flow rate to provide an indication thereof.

2. The invention of claim 1 further comprising a housing enclosing the wall member, said housing provided with a fluid input coupled to the wall member fluid inlet, and a fluid output communicating with the housing interior.

3. The invention of claim 1 further comprising a means to sense the deformation of the wall member.

4. The invention of claim 3 wherein said means to sense deformation further comprises a source of light and a means for sensing light oriented adjacent the wall member so that the expansion of the wall member in response to varying flow rates causes the amount of light from the source which reaches the light detector means to vary providing a flow rate output.

5. A fluid flow meter comprising:
   an enclosed housing having a fluid input and a fluid output;
   a wall member formed of an elongated deflated tube spirally wound in a coil defining an elastically expandable volume positioned within the housing, said tube being provided with an end extending from the outer periphery of the coil which serves as the fluid inlet cooperating with the housing fluid input, outlet means for allowing fluid to exit the expandable volume, and means for resisting the elastic deformation of the expandable volume to cause the volume to vary as a function of fluid flow rate whereby fluid flow through the meter causes a segment of the tube adjacent the fluid inlet to inflate and axially expand, unwinding the spiral coil an amount which varies as a function of flow rate; and
   means to sense the deformation of the expandable volume to provide a fluid flow rate indication.

6. A method of measuring the flow of a fluid comprising the following steps:
   providing a wall member which defines an elastically expandable volume having a fluid inlet and a fluid outlet, said outlet formed of a plurality of ports extending through said wall member at a plurality of spaced apart locations wherein the effective area of the ports varies proportional to wall member volume, and means for resisting the deformation of the expandable volume, wherein the size of the expandable volume is a a function of fluid flow rate;
   directing the flow of fluid to be measured into the wall member inlet; and
   sensing the size of the expandable volume to provide an indication of fluid flow rate.

7. The invention of claim 6 further comprising the step of measuring the temperature of the fluid and automatically correcting the indication of fluid flow rate to compensate for errors due to temperature variation.

8. A fluid flow meter comprising:
   a wall member defining an expandable volume formed of an elongated deflated tube spirally wound in a coil provided with an end extending from the outer periphery of the coil which services a fluid inlet, outlet means for allowing the fluid to exit the expandable volume, and means for elastically biasing the coil to the wound position, wherein fluid flow through the meter causes a segment of the tube adjacent the fluid inlet to inflate and axially expand, unwinding the spiral coil an amount which varies as a function of fluid rate to provide an indication thereof.

9. The invention of claim 8 wherein said outlet means further comprises a plurality of ports extending through the tube wall, said ports spaced apart along the tube length to sequentially open in response to the uncoiling of the tube.

10. The invention of claim 9 further comprising a housing enclosing the wall member, said housing provided with a fluid input coupled to the wall member fluid inlet, and a fluid output communicating with the housing interior.

11. The invention of claim 10 further comprising a means to sense the deformation of the wall member.

12. The invention of claim 11 wherein said means to sense deformation further comprises a source of light and a means for sensing light oriented adjacent the wall member so that the expansion of the wall member in response to varying flow rates causes the amount of light from the source which reaches the light detector means to vary providing a flow rate output.

13. The invention of claim 8 wherein said ports are oriented along the transverse edges of the deflated tube.

14. The invention of claim 13 wherein said means for resisting elastic deformation further comprises a spring biasing the well member to the minimum volume position.

15. A fluid flow meter comprising:
   a wall member defining an expandable volume formed of an elongated rigid tube having one end serving as a fluid inlet and having a plurality of outlet ports extending through the tube wall sequentially spaced along the tube axis, and an elastic rolling tubular sleeve affixed to the rigid tube and shiftable between a minimum volume position in which the rolling sleeve blocks the outlet ports and a maximum volume in which the output ports are opened; and means for biasing the elastic rolling tubular sleeve to the minimum volume position;

wherein said elastic rolling tubular sleeve shifts as a function of fluid flow rate to provide an indication thereof.

16. The invention of claim 15 further comprising a spring cooperating with the housing and the rolling sleeve to bias the rolling sleeve to the minimum volume position.

17. The invention of claim 16 wherein said means to sense the deformation of the expandable volume further comprises a linear variable-inductance differential transformer.

18. A fluid flow meter comprising:
a wall member defining an expandable volume formed of an elastic balloon-like bladder having a fluid inlet and a plurality of ports extending therethrough forming a fluid outlet, wherein said ports have an effective are which varies proportional to bladder volume, said bladder having a minimum volume and a low-flow condition and resiliently expanding in size as a function of fluid flow rate to provide an indication thereof; and means to sense the deformation of the expandable volume to provide a fluid flow rate indication.

19. A fluid flow meter comprising:
a housing;
a wall member defining an elastically expandable volume formed by an elongated tubular member cantileveredly attached to and enclosed within the housing, said tubular member having an inlet end attached to the housing forming a fluid inlet, and an outlet end acting as a fluid outlet which is normally punched closed, said tubular member elastically expanding as a function of fluid flow rate causing the fluid outlet to increase in area, said tubular member resiliently resisting the deformation caused by the flow, wherein said deformation varies directly as a function of fluid flow rate, thereby providing an indication thereof; and means to sense the deformation of the expandable volume to provide a fluid flow rate indication.

20. The invention of claim 19 wherein said means to sense the deformation of the expandable volume further comprises a light source and a means to sense light mounted within the housing so that the light striking the means to sense light varies as a function of the deformation of the tube.

21. The invention of claim 20 wherein said means to sense the deformation further comprises a mirror affixed to the tubular member generally adjacent the output end thereof to reflect light from a light source to the means to sense light.

22. A fluid flow meter comprising:
a bellows having a plurality of walls defining an expandable volume, said bellows provided with a fluid inlet and having a plurality of ports forming a fluid outlet extending through said walls which vary in effective area as a function of bellows volume;

means for biasing the bellows to a minimum volume position, wherein said bellows volume varies as a function of fluid flow rate and provides an indication thereof; and means to sense the deformation of the expandable volume to provide a fluid flow rate indication.

23. A method of measuring flow of a fluid, comprising the following steps:
providing an elongated, deflated tube spirally wound in a coil having an end extending from the outer periphery acting as a fluid inlet, and outlet means allowing fluid to exit to said outlet means having an effective area proportional to the degree of spiral unwinding;

directing the flow of fluid to be measured into the tube inlet causing the tube to inflate and axially expand partially unwinding the spiral coil an amount which varies as a function of flow rate; and sensing the unwinding of the spiral coil to provide an indication of fluid flow rate.

24. A method of measuring the flow of a fluid, comprising the following steps:
providing a wall member which defines an elastically expandable volume having a fluid inlet and a fluid outlet, the wall member formed of an elongated rigid tube having one end serving as the fluid inlet, and a plurality of output ports extending through the tube wall and sequentially spaced along the tube axis, and an elastic rolling tubular sleeve affixed to the rigid tube and deformable between a minimum volume position in which the rolling sleeve blocks the output ports, and a maximum volume position in which the output ports are open;

directing the flow of fluid to be measured into the fluid inlet; and sensing the position of the rolling tubular sleeve to provide an indication of fluid flow rate.

* * * * *

UNITED STATES PATENT AND TRADEMARK OFFICE
CERTIFICATE OF CORRECTION

PATENT NO. : 4,838,093

DATED : June 13, 1989

INVENTOR(S) : GEORGE CORSER, et al

It is certified that error appears in the above-identified patent and that said Letters Patent is hereby corrected as shown below:

Column 2, Line 12, after "fluid" delete --,--.

Column 2, Line 43, after "volume" insert --.--.

Column 3, Line 11, after "application" insert --.--.

Column 7, Line 22, "are" should be --area--.

Signed and Sealed this

Twenty-first Day of August, 1990

Attest:

HARRY F. MANBECK, JR.

*Attesting Officer*     *Commissioner of Patents and Trademarks*